(12) United States Patent
Dolcimascolo

(10) Patent No.: US 8,127,542 B1
(45) Date of Patent: Mar. 6, 2012

(54) PORTABLE HYDROELECTRIC GENERATING SYSTEM

(76) Inventor: Joseph Dolcimascolo, New Port Richey, FL (US)

( * ) Notice: Subject to any disclaimer, the term of this patent is extended or adjusted under 35 U.S.C. 154(b) by 0 days.

(21) Appl. No.: 13/189,688

(22) Filed: Jul. 25, 2011

Related U.S. Application Data

(63) Continuation-in-part of application No. 13/086,353, filed on Apr. 13, 2011, now abandoned.

(51) Int. Cl.
*F03B 17/02* (2006.01)

(52) U.S. Cl. .......................................... 60/398

(58) Field of Classification Search .................. 60/398; 415/6
See application file for complete search history.

(56) References Cited

U.S. PATENT DOCUMENTS

| | | | | |
|---|---|---|---|---|
| 271,040 | A * | 1/1883 | Cook | 60/496 |
| 3,903,700 | A * | 9/1975 | Glickman | 60/641.14 |
| 4,206,608 | A * | 6/1980 | Bell | 60/698 |
| 4,341,490 | A * | 7/1982 | Keeling | 405/36 |
| 4,426,846 | A * | 1/1984 | Bailey | 60/398 |
| 4,443,707 | A * | 4/1984 | Scieri et al. | 290/4 R |
| 4,514,977 | A * | 5/1985 | Bowen | 60/398 |
| 4,715,182 | A * | 12/1987 | Adams | 60/495 |
| 4,965,998 | A * | 10/1990 | Estigoy et al. | 60/325 |
| 5,007,241 | A * | 4/1991 | Saitou | 60/698 |
| 6,023,105 | A * | 2/2000 | Youssef | 290/54 |
| 6,051,892 | A * | 4/2000 | Toal, Sr. | 290/43 |
| 6,546,723 | B1 * | 4/2003 | Watten et al. | 60/398 |
| 6,666,024 | B1 * | 12/2003 | Moskal | 60/641.7 |
| 6,861,766 | B2 * | 3/2005 | Rembert | 290/43 |
| 6,981,376 | B2 * | 1/2006 | Dutta | 60/639 |
| 7,222,487 | B1 * | 5/2007 | Hinkley | 60/639 |
| 7,656,050 | B2 * | 2/2010 | Riley | 290/43 |
| 2005/0279085 | A1 * | 12/2005 | Moore et al. | 60/398 |
| 2006/0150625 | A1 * | 7/2006 | Behrens | 60/495 |

* cited by examiner

*Primary Examiner* — Thomas E Lazo
(74) *Attorney, Agent, or Firm* — RG Patent Consulting LLC

(57) ABSTRACT

Ancient Hydroelectric Company comprises a portable hydro-electricity producing system. Consumers are provided with a cost-effective and reliable system for providing substantially clean electricity generation without obstructing the water source or negatively affecting the environment. The high efficiency portable hydro-electric producing system is for use with a moving water source. The system uses antifreeze with water to provide a more thermally efficient working fluid as used to improve the system's pressure and volume capacity in use.

1 Claim, 3 Drawing Sheets

PORTABLE HYDROELECTRIC GENERATING SYSTEM

CROSS-REFERENCE TO RELATED APPLICATION

The present application is a Continuation-in-Part (CIP) related to and claims priority from prior provisional application Ser. No. 61/330,509, filed May 3, 2010, abandoned non-provisional application Ser. No. 12/887,962 filed Sep. 22, 2010 and pending non-provisional application 13/086,353 filed Apr. 13, 2011 which applications are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

1. Field of the Invention

The present invention relates generally to the field of hydro-electric producing systems and more specifically relates to a high efficiency portable hydro-electric producing system for use with a water source.

2. Description of the Related Art

Hydroelectricity is electricity generated by hydropower, typically the production of electrical power through the use of the gravitational force of falling or flowing water. Traditionally it has been the most widely used form of renewable energy. Once a hydroelectric complex is constructed, the project produces no direct waste, and has a considerably lower output level of the greenhouse gas carbon dioxide ($CO_2$) than comparable fossil-fuel-powered energy plants. Most hydroelectric power comes from the potential energy of dammed water driving a water turbine and generator. The energy extracted from the water depends on the volume and on the difference in height between the source and the water's outflow. This height difference is called the head. The amount of potential energy in water is proportional to the head. This form of energy may create less detrimental effects to the environment however, damming of water has been shown to have its own negative effects.

As discussed previously, hydroelectricity is the most widely used form of renewable energy in the world. It has proven to more efficient than wind, solar, and wave production but large-scale operations may have dramatic effects on local environments. One common method of producing hydropower is to dam a river to create a reservoir for operating a power plant. This can submerge large areas of vegetation, cause fragmentation, and be generally disruptive to areas upstream and downstream of the dam. Small-scale hydropower, on the other hand, typically incorporates the use of a weir rather than a dam, therefore avoiding these adverse effects. However, the cooling systems in mini-hydro designs are often inefficient and therefore decrease the electricity-producing efficiency. Further, due to the present systems being open to the environment, within natural systems, problems still exist. Thus, a need exists for an improved high efficiency portable hydro-electric producing system which the present invention addresses.

Various attempts have been made to solve the above-mentioned problems such as those found in U.S. Patent and Publication No. 2009/0226308; U.S. Pat. Nos. 5,782,097; 4,220,006; 5,603,218; 5,570,584; and 6,672,054 as briefly described below.

U.S. Publication Nos. 2009/0226308 discloses a combined cold and power (CCP) system and method for improved turbine performance. The system improving the efficiency of heat exchange between at least two fluid streams comprising: a vertical cold flue assembly comprising a plate fin heat exchanger and having a top and a bottom such that at least one fluid sinks through the top of the cold flue assembly, through the plate fin heat exchanger and through the bottom of the cold flue assembly. The system serves to decrease emissions by recovering waste heat and allows power plants to operate at relatively low pressure. The present invention seeks to operate at increased pressures to increase volume capacity.

U.S. Pat. No. 5,782,097 discloses a generator-absorber-heat exchange heat transfer apparatus and method and use thereof in a heat pump. The invention also provides, in another aspect, a heat pump comprising an indoor liquid to air heat exchanger, an outdoor liquid to air heat exchanger, the generator-absorber heat exchange apparatus and an antifreeze circuit. This patent by Benjamin A. Phillips et al does not appear to be portable.

Disclosed in U.S. Pat. No. 4,220,006 is a power generator utilizing the full volumetric expansion of water upon its change from the liquid phase to the solid phase (ice). The generator includes a chamber having heat transmitting, fluid impervious, flexible walls. The U.S. Pat. No. 4,220,006 to Robert J. Kindt appears to use water without any form of antifreeze present since the system uses ice in its volumetric expansion of water upon its change from the liquid phase to the solid phase (ice) to create energy.

In U.S. Pat. No. 5,603,218 to Frank C. Hooper discloses a binary cycle for the recovery of heat in exhaust gases involving a conversion of waste heat to power. Conversion of heat from high-temperature off-gases into useful work is accomplished with a process having first and second stages. The first stage comprises preheating feed water with heat from the off-gases, converting this into steam, passing the steam into a steam expander which drives a first machine, condensing the low pressure exhaust from the expander, and returning the condensate to the preheater to repeat the cycle. The second stage comprises preheating liquid fluorocarbon working fluid, passing the working fluid through a separator and then through the steam condenser, from which a liquid/gas mixture of the working fluid is routed back to the separator, superheating the gaseous working fluid by off-gases, passing the gaseous working fluid into an expander which drives a second machine, condensing the low pressure exhaust from the expander, and returning the liquid fluorocarbon working fluid to the preheater to repeat the cycle. Heat is provided to the process by passing high temperature off-gases, 350 to 1100 degrees Celsius, in sequence through the steam superheater, the water boiler, the fluorocarbon superheater, and the feed water heater. The present invention described herein does not serve to operate using exhaust gases from incinerators or other, but rather from substantially clean potential and kinetic energy sources.

Disclosed in U.S. Pat. No. 5,570,584 is a generator-absorber heat exchange transfer apparatus and method using an intermediate liquor. The first stage of the process disclosed comprises pumping the feed water through a fluorocarbon working fluid preheater before passing the feed water through the first stage. The heat pump is comprised of two major sections, the generator-absorber heat exchange apparatus (absorption unit) and the antifreeze fluid system. The generator absorber heat exchange apparatus includes an absorber, generator, condenser and evaporator. The patent, also to Benjamin A. Phillips et al discloses a non-portable multi-phase heat exchange unit, whereas the present invention involves use of water in the liquid phase only.

Disclosed is a hydroelectric power plant in U.S. Pat. No. 6,672,054 to Paul H. F. Merswolke et al using a plurality of windmills connected to compressed air generators to produce pressurized air. Pressurized air is used to drive water through a turbine to produce electrical power. The water is recycled and the power plant includes reserve pressurized air tanks to allow the plant to continue to operate when the wind levels are not sufficient to produce high pressure air. The power plant is designed to be operated on a continuous basis based on wind power. The invention disclosed herein deals exclusively in the use of water as an energizing means to generate power therefrom.

None of the above mentioned patents disclose a substantially closed system for use with flowing water to provide electrical generation designed using antifreeze with water as a more thermally efficient working fluid thereby realizing greater pressure and volume capacity in use.

This prior art is representative of generators. None of the above inventions and patents, taken either singly or in combination, is seen to describe the invention as claimed. Ideally, a hydro-electric producing system should require minimal maintenance, be portable and, yet operate reliably and be manufactured at a modest expense. Thus, a need exists for a reliable high efficiency portable hydro-electric producing system to provide efficient generating means and to avoid the above-mentioned problems.

BRIEF SUMMARY OF THE INVENTION

In view of the foregoing disadvantages inherent in the known hydro-electric generators art, the present invention provides a novel high efficiency portable hydro-electric producing system. The general purpose of the present invention, which will be described subsequently in greater detail is to provide a high efficiency portable hydro-electric producing system for use in all climatic conditions and locations. The system uses antifreeze with water to provide a more thermally efficient working fluid thereby realizing greater pressure and volume capacity in use.

The present invention comprises a portable hydroelectricity producing system. This novel design of the present invention provides consumers with a cost-effective and reliable system for providing substantially clean electricity generation without obstructing a water source or negatively affecting the environment. The system uses antifreeze with water to provide a more thermally efficient working fluid as used to improve the greater pressure and volume capacity in use.

A portable hydro-electric generating system for such use is described herein comprising: at least one turbine assembly having, at least one intake; and a return; a tank with an inner volume to provide a head-pressurizing means (for hydraulically-pressurizing the water/antifreeze mixture contained in the system such that it can be distributed as required as according to Bernoulli's equation for incompressible fluid mechanics); the system using a antifreeze/water mixture working fluid such that the working fluid doesn't freeze during cold weather conditions (thereby protecting the system from failing or being damaged and working fluid from being stopped in its movement throughout the system. Turbine(s) are able to be shut off and circulation maintained via pumps or other pressurized means) to perform maintenance tasks.

Further, antifreeze mixture provides a lubrication means, increased heat dissipation for moving parts and other such advantageous features such that the system is able to be used 365 days a year in various climatic conditions to produce reliable powering means. The system uses the available head pressure in the tank which is maintained throughout the closed system to create downward pressure, (the storage tank holding a volume of approximately 4300 gallons of the antifreeze/water mixture for dispersing through the system); at least two water wheels; wherein the antifreeze/water mixture working fluid is passed through the turbine assembl(ies) through the intake(s) and the return, respectively, creating a low pressure area (sub-vacuum) at the intake(s) and into the tank with an inner volume as the water wheel is turned by a moving water source optionally using a hose, a weir or other suitable inlet to the system.

The antifreeze/water mixture working fluid is resistance-passed through the system by the head pressure forcing down on the working fluid (antifreeze/water mixture) in a manner similar to present city water systems (changing potential to kinetic energy), creating hydraulic pumping means thereby creating a means for storing potential energy whereby pressure may be regulated within the portable hydro-electric generating system via petcocks, or check and slide valves and valve stations. The force-transmitted flow-movement of the antifreeze/water mixture through the portable hydro-electric generating system by the hydraulic pumping means creates a power-generating means that may be manually controlled via the petcocks strategically located which allow the system to be balanced and as a maintenance means to promote reliability, and consistency in use. In instances wherein the turbine(s) or other components/systems require maintenance the system may be shut down and a minimum flow maintained via pumps to continue to produce energy. No damage is done via freezing and a minimum of electrical generation is maintained via the small amount of flow during these periods. Within the present invention the tank (with or without a sump, as an accumulator or not as an accumulator) may be filled via at least one pipe, hose or other water transporting means, a pressure relief valve being located on top of the tank with a 100 lb gauge. The present system may be used to power a working farm, and/or a remote village, and/or an urban grid without creating a large environmental impact/footprint.

A kit is also disclosed herein including: a turbine assembly (enclosed within or not enclosed within) at least one tank; a volume of antifreeze/water mixture working fluid (that may prevent freezing in cold temperature environments and further provide lubrication means); at least one pump (natural or provided-manmade) to provide at least one hydraulic pumping means; at least two water wheels; and optionally a set of operating instructions for installation and/or use. A suitably equipped (multiple-wheeled) trailer having 3×12 boards fit to an 8 foot deck using a 4×4 angle iron frame (two angle irons inverted and two not inverted) with a hitch. The hitch and trailer deck may be overlaid with diamond plate for ease of cleaning. This feature trailer provides that the system is portable between locations. The tanks may be mounted to the floor preferably via four (3" I-Beam with holes drilled in for fastener attachment) legs/posts, ties being used to attach to mushroom tie downs on the deck. The tanks may use sash locks to be held in place.

Lastly, a method of using a portable hydro-electric producing system is described herein comprising the steps of: taking/diverting water from a water source; diverting the water through an intake area at a weir; slowing the water allowing particles to settle from the water before the sediment-reduced water ascends into the turbine assemblies; mixing the water with a predetermined amount of antifreeze thereby creating a water/antifreeze mixture and pumping the water/antifreeze mixture into the turbine (assembly) via a pressure pipe; thereby creating a flow for generating power. The antifreeze/water mixture comprises a working fluid allowing the system to realize greater pressure and volume capacity in use because of its inherent thermal qualities and protection from freezing. The method may further comprise the step of regulating and balancing the portable hydro-electric generating system via petcocks (or other suitable means). As described above, the power provided/generated may be used by a working farm, and/or a remote village, and/or an urban area and/or introduced into at least one existing power grid for monetary compensation (means for monetizing the present invention). In these and other ways the present invention may serve as a cost-effective power-providing system that is relatively maintenance-free, easy to assemble in a vast variety of environments and minimizes environmental impact.

The present invention holds significant improvements and serves as a high efficiency portable hydro-electric producing system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, ancient hydroelectric company, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a portable hydroelectricity producing system and more particularly to a high efficiency portable hydro-electric producing system. The system uses antifreeze with water to provide a more thermally efficient working fluid as used to improve the pressure and volume capacity in use. Further, the working fluid is cost-effective in use because it permits the portable hydroelectricity producing system of the present invention to work regardless of the ambient temperature.

Figure 1:
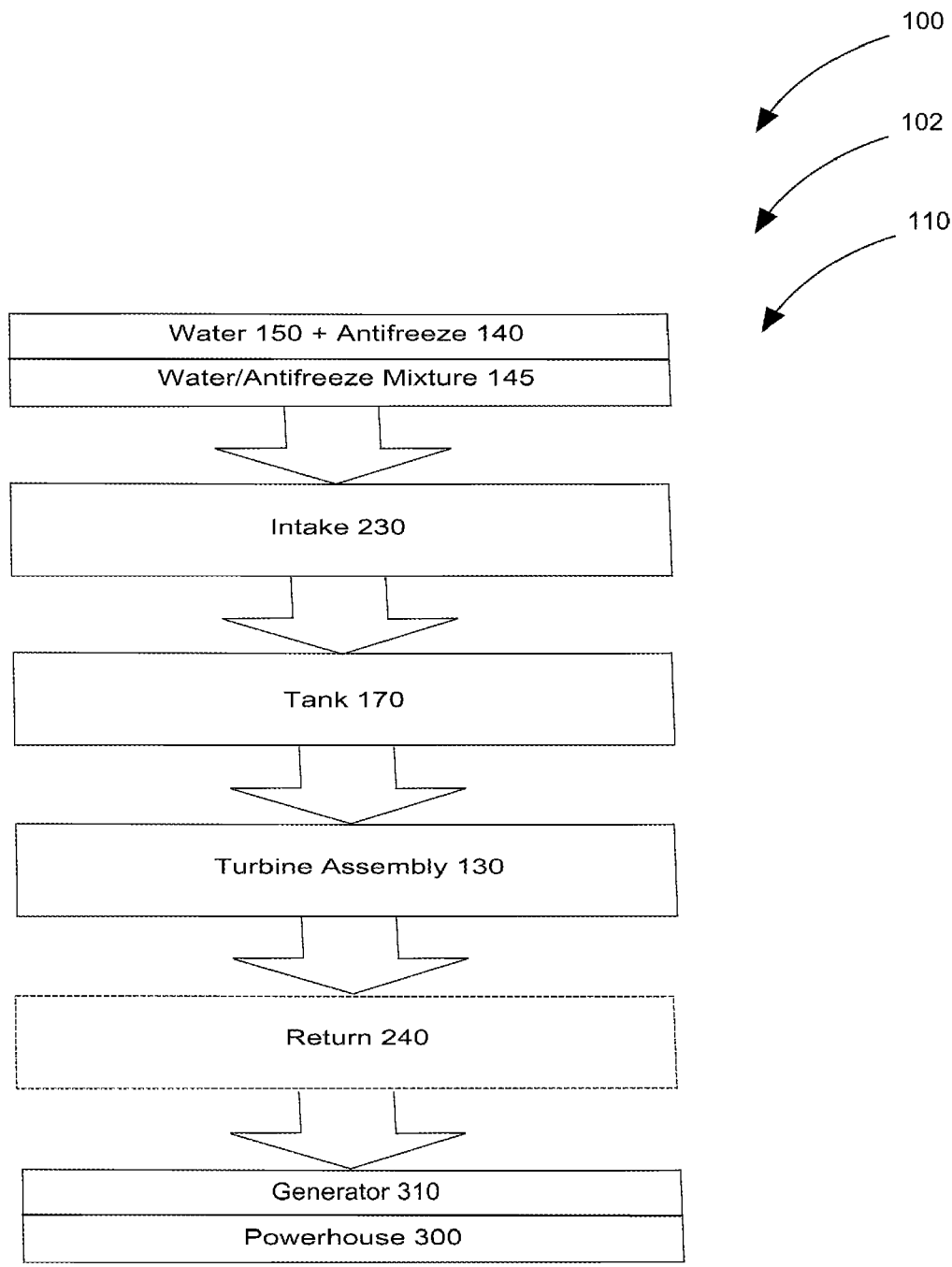
FIG. 1 shows a perspective view illustrating a flowchart of operation of a portable hydroelectricity producing system according to an embodiment of the present invention.

Referring to the drawings by numerals of reference there is shown in FIG. 1, a perspective view illustrating flowchart 102 of operation of portable hydroelectricity producing system 110 according to an embodiment of the present invention.

Flowchart 102 illustrates the 'flow' of portable hydroelectricity producing system 110. Portable hydro-electric generating system 110 in this particular embodiment comprises: at least one turbine assembly 130 having, at least one intake 230; and at least one return 240; at least one tank 170 with an inner volume; a antifreeze/water mixture 145 working fluid; providing at least one hydraulic pumping means; at least one water wheel 250 (preferably two or four as required to produce the desired energy output); wherein antifreeze/water mixture 145 working fluid is passed through turbine assembly 130 through intake(s) 230 and return 240, respectively, creating a low pressure area at intake(s) 230 and into tank 170 with an inner volume as at least one water wheel 250 is turned by a water source.

Antifreeze/water mixture 145 comprises antifreeze 140 in a suitable volume mixed with water 150 to form the working fluid which is resistance-passed through modified portable hydro-electric generating system 110, by hydraulic pumping means creating a pressure and is regulated within portable hydro-electric generating system 110 via a petcock valve located between an outlet of the pump and an outlet of the tank. Hydraulic pumping means is maintained in the system using the available head pressure (potential energy) that is convertible to kinetic energy, similar in function to a city water system used to service and provide water to a plurality of homes. Available head pressure is able to distribute water, as needed, using consistent pressure as per Bernoulli's principal of the conservation of energy which states that, in a steady flow, the sum of all forms of mechanical energy in a fluid along a streamline is the same at all points on that streamline. Thus an increase in the speed of the fluid occurs proportionately with an increase in both its dynamic pressure and kinetic energy, and a decrease in its static pressure and potential energy. If the fluid is flowing out of a reservoir the sum of all forms of energy is the same on all streamlines because in a reservoir the energy per unit mass (the sum of pressure and gravitational potential $\rho$ g h) is the same everywhere.

Thus, the force-transmitted flow-movement of antifreeze/water mixture 145 through portable hydro-electric generating system 110 by hydraulic pumping means creates a power-generating means for generator 310. As antifreeze/water mixture 145 is passed over turbine assembly 130, turbine assembly 130 is caused to turn such that electricity may be produced via rotation of a wheel extracting energy from the fluid flow converting it to useful work via a rotor assembly. Those with ordinary skill in the art will now appreciate that upon reading this specification and by their understanding the art of rotors as described herein, methods of electrical production will be understood by those knowledgeable in such art.

Figure 2:
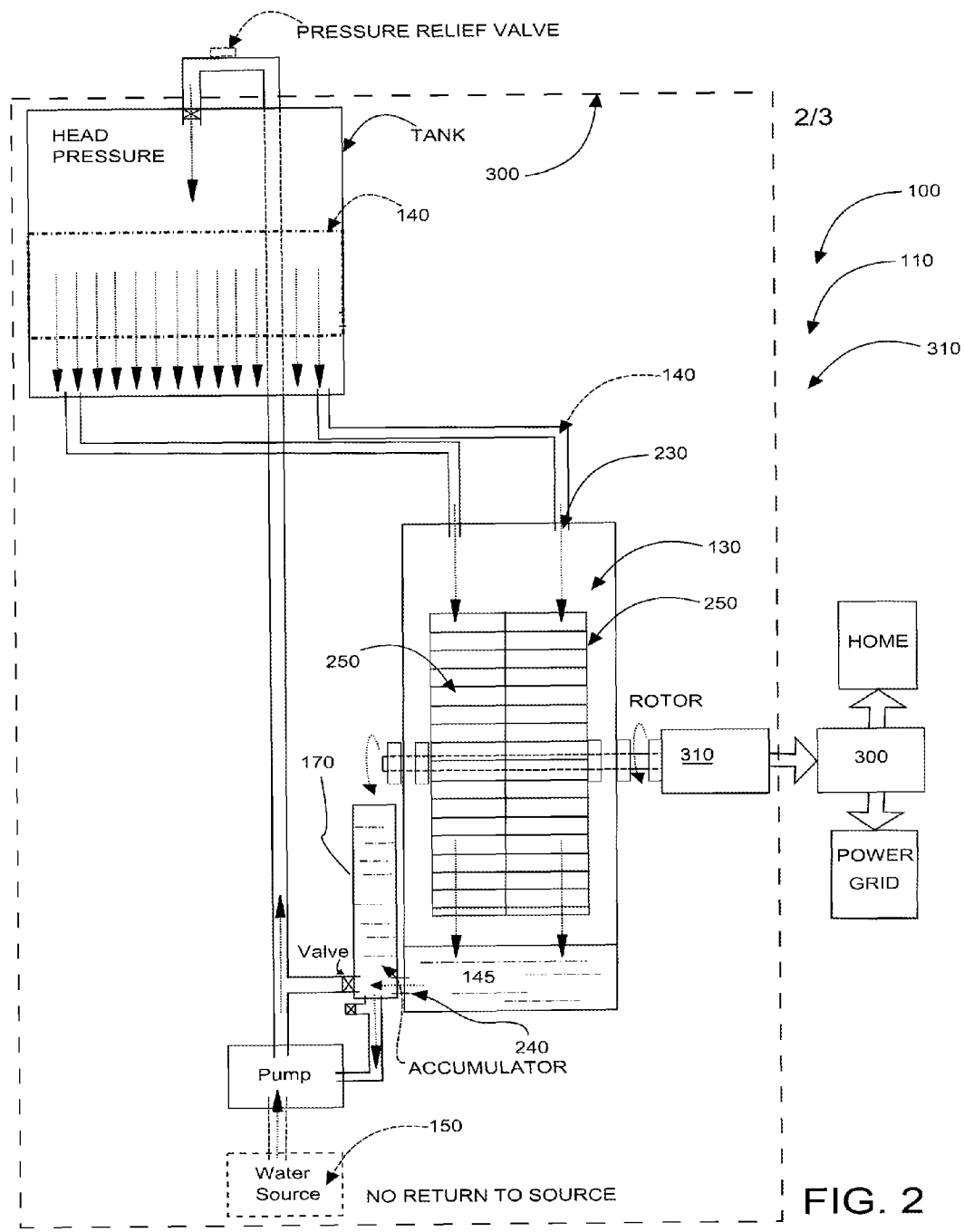
FIG. 2 is a perspective view illustrating the portable hydroelectricity producing system according to an embodiment of the present invention of FIG. 1.

Referring now to FIG. 2, a perspective view illustrating portable hydroelectricity producing system 110 according to an embodiment of the present invention of FIG. 1.

FIG. 2 illustrates more specifically one of the possible embodiments of the invention disclosed as portable hydro-electric generating system 110 comprising: turbine assembly 130 (one or more turbines in parallel or series—preferably at least two) each having, at least one intake 230; and a return 240; a tank 170 with an inner volume, as stated previously. Water 150 is contained and distributed from inside tank 170 throughout the system. Tank 170 has an inner volume and may comprise an accumulator.

Antifreeze/water mixture 145 is able to absorb much greater amounts of heat when compared to that of water 150, is able to withstand lower temperatures, and raises the boiling point of water 150. Water/antifreeze mixture 145 provides a lower freezing point. The lowered freezing point allows portable hydro-electric generating system 110 to operate in decreased temperatures and due to the inherent properties of water/antifreeze mixture 145 also is able to operate more efficiently in increased temperatures. In this way the present invention is more suitable for use in a variety of temperatures and pressures as compared to conventional systems. It should be noted that the use of water/antifreeze mixture 145 also provides many other benefits such as lubrication means to extend longevity of portable hydro-electric generating system 110 and other.

Water/antifreeze mixture 145 may be supplied to tank 170 via a hose or other such water-transporting means available and then tank 170 may be closed whereby water/antifreeze mixture 145 is passed over the wheel and returned to tank 170 via pumps or other. This invention is a suitable as a kinetic powering means. The pumps may be used to pressurize the system. It should be appreciated that although the present system is efficient in use and useful over a wide range of temperatures that the system requires outside energy sources and is not 'self-perpetuating' in motion.

Tank 170 in this particular embodiment is preferably 20' high×4' long×4' wide to create suitable head-pressure to 'work' the system. Tank 170 preferably comprises a 2"line with adapters at the bottom of tank 170. The 2" line is provided with water/antifreeze mixture 145 under the influence of the described head pressure. Antifreeze/water mixture 145 working fluid is passed through turbine assembly 130 through intake(s) 230 and return 240, respectively, wherein return 240 may include a sanitary tee with a 6" sweep creating a low pressure area at intake(s) 230 and into tank 170 (with an inner volume) as water wheels 250 are turned (creating a rotation about an axle carried by bearings) by a flowing water source. It should be noted that the rotation may be circular about the axle or elliptically-cammed according to desired orientation for maximum effectiveness. Antifreeze 140 may be added in suitable amounts to water 150 to maintain proper proportion of water/antifreeze mixture 145. Trailer may be oriented perpendicular to water wheels 250 and provide a means whereby the present system can be moved between locations to provide remote powering. The system may be disassembled and hooked to a water source such as a water well and used to provide electricity producing means.

Hydraulic pumping means creating the pressure is preferably regulated within portable hydro-electric generating system 110 via petcocks. Force-transmitted flow-movement of antifreeze/water mixture 145 through portable hydro-electric generating system 110 by hydraulic pumping means creates a power-generating means capable of generating over 89,000 watts and producing over 160 Horsepower watts which may be used to power a working farm, and/or a remote village, and/or an urban area.

It should be noted that working fluid of antifreeze/water mixture 145 allows portable hydroelectricity producing system 110 to realize greater pressure and volume capacity in use because of inherent thermal qualities, as described above, thereby drastically increasing the efficiency and longevity over traditional powering systems. In this way, the portable hydroelectric generating system according to the present invention provides consumers with a cost-effective and reliable system for providing substantially clean electricity generation without obstructing the water source or negatively affecting the environment.

Portable hydroelectricity producing system 110 may be tailored to generate power for at least one home or constructed on a larger scale for selling into the power grid. The versatile nature of portable hydroelectricity producing system 110 makes it ideal for use in an assortment of locations ranging from a working farm, to a remote village, to an urban area. The inventor has calculated that the present invention as described herein may conservatively power may power up to 5,356 homes using two water wheel(s) 250. In this way this invention is ideal for use in environments and in nations with undeveloped or underdeveloped powering systems and means. Further, the present invention may be used to supply developed nations with cost-effective power conversion means by using the system to feed the existing grid. Those with ordinary skill in the art will now appreciate that upon reading this specification and by their understanding the art of power generating, distribution and introduction into the existing power grid as described herein, methods of powering means and communication will be understood by those knowledgeable in such art. It should be understood that the present invention can be used in parallel systems to generate power.

A pressure pipe can send water 150 mixed with a predetermined amount of antifreeze 140 into turbine assembly 130, which is substantially enclosed in powerhouse 300 with at least one generator 310 and control equipment. Tank 170 within this particular embodiment preferably comprises an inner volume also further comprising an accumulator. In other embodiments water wheel(s) 250 are carried via a supported axle and contained within the inner volume of tank(s) 170 and tank(s) 170 preferably comprise sump(s) to substantially contain water/antifreeze mixture 145.

Figure 3:
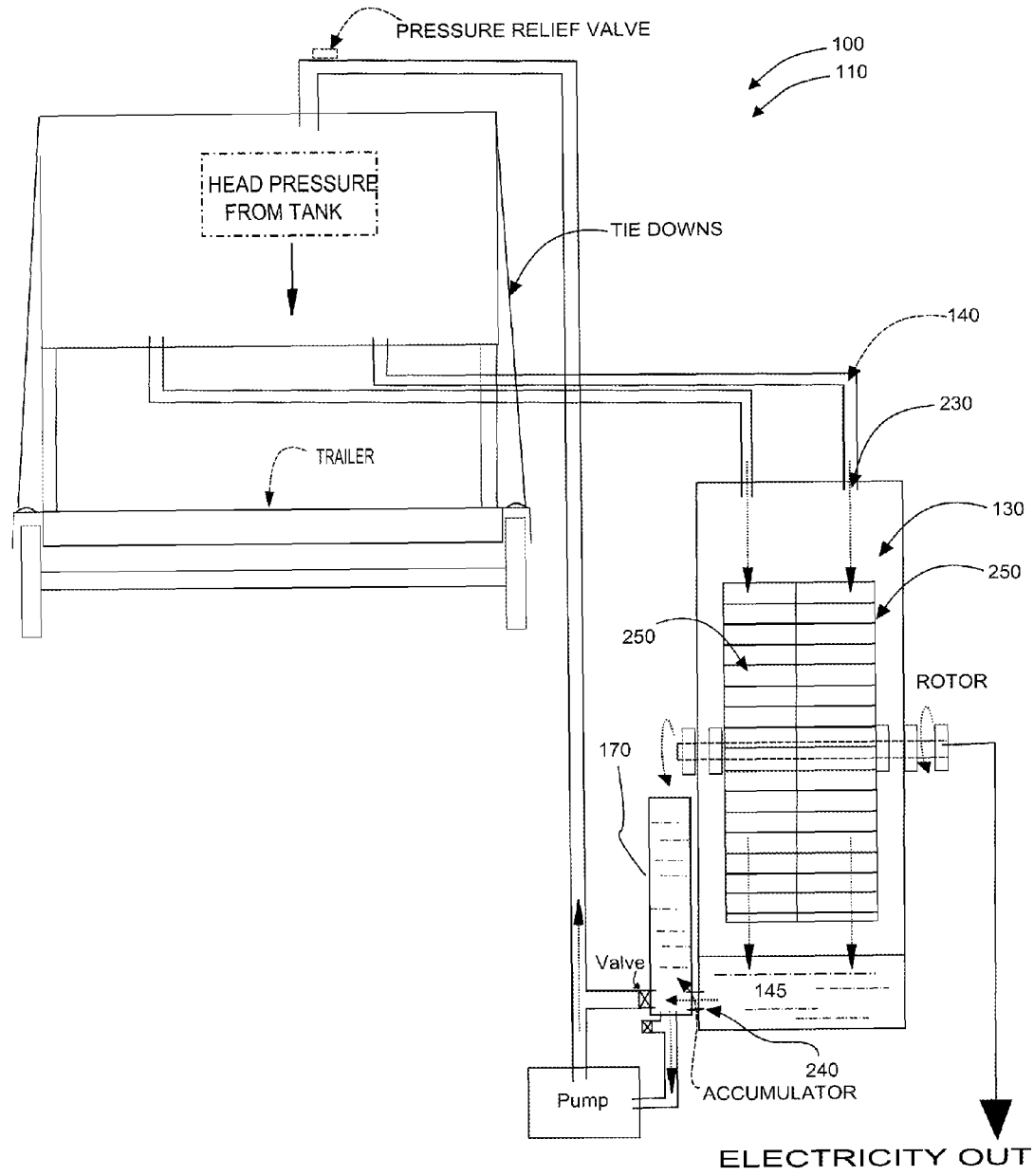
FIG. 3 is another perspective view illustrating the portable hydroelectricity producing system according to an embodiment of the present invention of FIG. 2.

Referring now to FIG. 3 showing another perspective view illustrating the portable hydroelectricity producing system 110 according to an embodiment of the present invention of FIG. 2.

Portable hydroelectricity producing system 110 as illustrated is capable of using about 4,300 gallons of water to generate over 89,000 watts to produce over 160 Horsepower. Over the course of one year the present invention may produce about 5,356,800 kilowatt hours of usable clean energy to be consumed. The present system is a conserver of energy via the head-pressure such that much of the energy used is recycled to be re-used thereby increasing the relative efficiency of such a system. In this way the present invention can be used to 'store' potential energy, and operate as per Bernoulli's theorem to provide kinetic energy as water wheel(s) 250 are turned as water mixture passes over them causing water wheel(s) 250 to rotate thereby creating electrical energy that may be used to power external devices (as indicated.)

As previously mentioned portable hydro-electric generating system 110 is portable and may be transported between locations using trailer. The trailer may comprise planking, securing means to hold tank(s) 170 mounted thereon. The system may be connected or disconnected with relative ease, provided no antifreeze/water mixture working fluid 145 is spilled to contaminate the environment. Antifreeze/water mixture working fluid 145 is only passed internally within the system over water wheels 250 to tank 170 and back, water source may be externally used to power the system for example a waterfall may be directed onto external vanes to turn water wheels 250, thereby not mixing with antifreeze/water mixture working fluid 145 that is kept within the confines of the system.

Portable hydro-electric generating system 110 for manufacture, sale or use may comprise kit 330 including: turbine assembly 130; tank 170; antifreeze/water mixture working fluid 145; at least one pump to provide at least one hydraulic pumping means; at least one water wheel 250; and optionally a set of operating instructions. Portable hydro-electric generating system 110 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, components arranged in series or parallel for power generating means, parts may be sold separately, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A portable hydro-electric generating system comprising:
    at least one turbine assembly having,
        at least one intake; and
        a return;
    a tank with an inner volume of water contained inside, said inner volume of water comprising an accumulator;
    an antifreeze/water mixture working fluid which allows the system to realize greater pressure and volume capacity in use because of inherent thermal qualities;
    said tank is 20 feet high×4 feet long×4 feet wide and is used to create head pressure;
    at least one centrally located vertically-run pipe wherein said pipe is 6 inches in diameter and runs vertically to return said antifreeze/water mixture working fluid to said tank;
    at least one hydraulic pumping means comprising pumps and head pressure to maintain a flow when the portable hydro-electric generating system is shut down;
    a plurality of water wheels;
    wherein said antifreeze/water mixture working fluid is passed through said turbine assembly through said intake(s) and said return, respectively, creating a low pressure area at said intake(s) and into said accumulator as said at least one water wheel is turned by the antifreeze/water mixture working fluid;
    wherein said antifreeze/water mixture working fluid is resistance-passed through said portable hydro-electric generating system creating said hydraulic pumping means;
    wherein the hydraulic pumping means is regulated by a petcock valve located between an outlet of the pump and an outlet of said accumulator; and
    wherein force-transmitted flow-movement of said antifreeze/water mixture through said portable hydro-electric generating system by said hydraulic pumping means creates a power-generating means via a rotor capable of recycling about 4,300 gallons of water capable of producing over 160 Horsepower to power a working farm, and/or a remote village, and/or an urban area.

\* \* \* \* \*